March 28, 1961 B. VAN BREEMAN 2,977,415
PORTABLE PRINTING COMMUNICATOR
Filed April 21, 1960 6 Sheets-Sheet 1

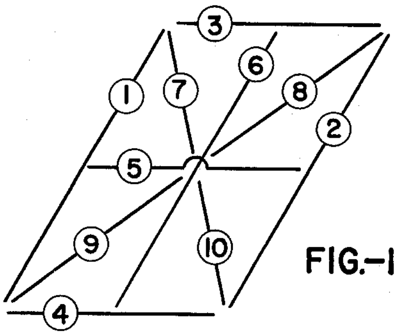

FIG.-1

| CHARACTER | S-1 | S-2 | S-3 | S-4 | S-5 | S-6 | S-7 | S-8 | S-9 | S-10 | S-11 |
|---|---|---|---|---|---|---|---|---|---|---|---|
| SPACE | | | | | | | | | | | X |
| Q | X | X | X | X | | | | | | X | X |
| A | X | X | X | | X | | | | | | X |
| 2 | | | X | X | | | | X | X | | X |
| Z | | | X | X | X | | | X | X | | X |
| W | X | X | | | | | | | X | X | X |
| S | | | X | X | | | X | | | X | X |
| 3 | | | X | X | | | | X | | X | X |
| X | | | | | | | X | X | X | X | X |
| E | X | | X | X | X | | | | | | X |
| 4 | | X | | | X | | | X | | | X |
| D | | X | X | X | | X | | | | | X |
| C | X | | X | X | | | | | | | X |
| R | X | | X | | X | | | X | | X | X |
| F | X | | X | | X | | | | | | X |
| 5 | | | X | | | | X | | X | | X |
| V | | X | | | | | X | | | X | X |
| T | | | X | | | X | | | | | X |
| G | X | | X | X | | | | | | X | X |
| 6 | | | | X | | | | X | X | X | X |
| B | X | | X | X | X | | | X | | X | X |
| Y | | | | | | | X | X | X | | X |
| H | X | X | | | X | | | | | | X |
| 7 | | | X | | | | | X | X | | X |
| N | X | X | | | | | X | | | X | X |
| U | X | X | | X | | | | | | | X |
| J | | X | | X | | | | | X | | X |
| 8 | | | X | X | | | X | X | X | X | X |
| M | X | X | | | | | X | X | | | X |
| I | | | X | X | | X | | | | | X |
| K | X | | | | X | | | X | | X | X |
| 9 | | | X | | | | X | X | X | | X |
| O | X | X | X | X | | | | | | | X |
| L | X | | | X | | | | | | | X |
| P | X | | X | | X | | | X | | | X |
| – | | | | | X | | | | | | X |

FIG.-2

INVENTOR.
BERTRAM VAN BREEMEN
BY
[signature]
ATTORNEY

*INVENTOR.*
BERTRAM VAN BREEMEN
*BY*
[signature]
ATTORNEY

INVENTOR.

BY BERTRAM VAN BREEMEN

ATTORNEY

INVENTOR.
BERTRAM VAN BREEMEN
BY
ATTORNEY

T1 CORE - ARNOLD ENG CO. # 4T 5651S1
W1 - 72T CT # 24
W2 - 12T CT # 28
W3 - 56T # 28
W4 - 160T CT # 28
L1 AND L2
CORE FERROXCUBE # 380 P 315 E1 - 382
AND BOBBIN 380 F 375
100 T # 24

INVENTOR.
BERTRAM VAN BREEMEN
BY
A. H. Oldham
ATTORNEY

March 28, 1961 B. VAN BREEMAN 2,977,415

PORTABLE PRINTING COMMUNICATOR

Filed April 21, 1960 6 Sheets-Sheet 6

INVENTOR.

BY BERTRAM VAN BREEMEN

ATTORNEY 2,977,415

PORTABLE PRINTING COMMUNICATOR

Bertram Van Breeman, Phoenix, Ariz., assignor to Goodyear Aircraft Corporation, Akron, Ohio, a corporation of Delaware Filed Apr. 21, 1960, Ser. No. 23,779
8 Claims. (Cl. 178—30)

This invention relates to remotely operated, portable type communicating apparatus adapted to print a message on tape at speeds of at least 100 words a minute.

Heretofore, Teletype apparatus of a wide variety of types has been proposed or provided for printing messages at a distance, but such known apparatus has been open to the objection that it is complicated, heavy and expensive and does not readily adapt itself to portable use, for example, use in transmitting communications during battle to soldiers in the field and back carrying the receiving and printing apparatus. Nor does known apparatus adapt itself to use in aircraft, again because of weight and size requirements.

It is the general object of the invention to avoid and overcome the foregoing and other objections to prior art practices by the provision of an improved, simplified, long-lived, relatively lightweight and small-sized communicating apparatus for rapidly and legibly printing messages at a distance and with complete security.

Another object of the invention is to provide battery operated apparatus of the character described and adapted to mobile operation, for example use by soldiers in battle, use by utility repairmen, use by aircraft, and the like.

For a better understanding of the invention reference should be had to the accompanying drawings wherein:

Fig. 1 is an enlarged diagrammatic plan view of the printing matrix of the invention;

Fig. 2 is a chart illustrating the matrix elements actuated to produce each space, letter, numeral or sign;

PRINCIPLE OF OPERATION

The basic principle of operation depends upon the fact that all letters of the alphabet, and all numerals from zero (0) through nine (9) may be printed with as few as ten (10) line segments. By energizing various combinations of these segments arranged as shown in Figure 1, all of the letters and numbers may be printed. Fig. 2 specifically illustrates in chart form which segments of the matrix of Fig. 1 are energized to produce each letter and numeral.

Figure 9:
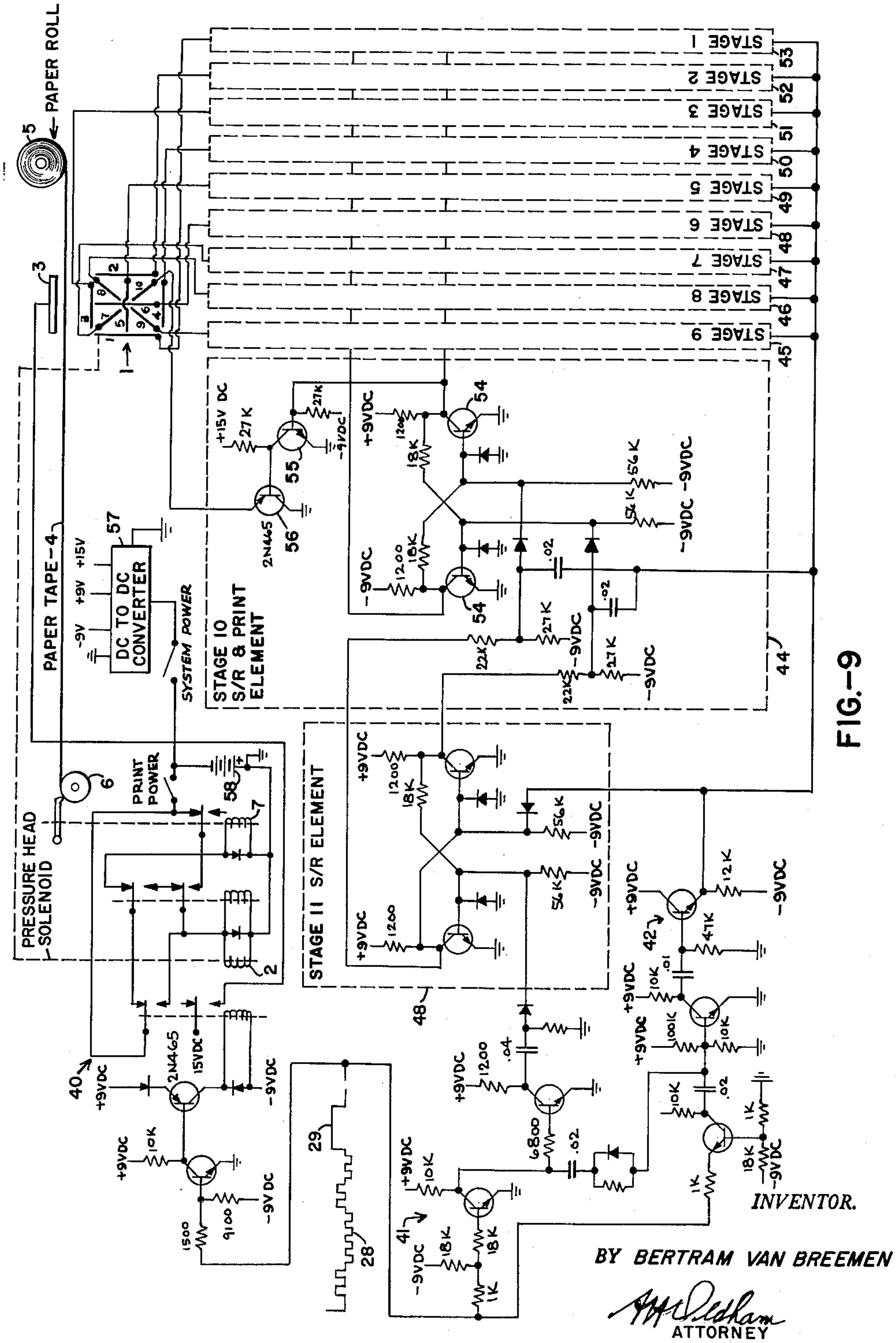
Fig. 9 is a wiring diagram of the decoder printer of Fig. 3.

The matrix of Fig. 1 is made from a steel plate 1 slightly larger than the letter to be printed and formed with a plurality of small holes, for example .013" in diameter receiving and positioning 10 mil enameled iron wire to form the different segments of the matrix. As best seen in Fig. 9 a cup-shaped electromagnet or other operating solenoid 2 is associated with the print head and a circular steel platen 3 is moved to the cup magnet or by the solenoid during the printing operation upon electrosensitive tape 4 pulled from a roll 5 by a paper drive capstan 6 operated by a solenoid 7. The surface of the print head 1 is covered with plastic to leave the wires half exposed and the enamel is ground off the outer surface of the wires forming the surface of the matrix so that each wire segment when energized will make electrical contact with the paper tape.

The means chosen for providing a code for each letter is a sequence of pulses (some positive and some negative) which is stored in a shift register. Under very high speed printing the sequence may be stored in a delay line. After the code corresponding to given letter has been stored, a print pulse causes those elements of the shift register containing a positive pulse to energize the corresponding elements of the print matrix, thus causing a current to flow through the electro-sensitive paper 4 and thereby producing legible line segments which form the letter.

In order to distinguish the print pulse from the pulses carrying letter or numeral information it is necessary to make the amplitude of the print pulse significantly greater than the amplitude of the information pulses. For convenience, a positive pulse whose amplitude is twice that of the information pulses, is used. In order to allow adequate time for printing and paper advance, the print pulse is made, for example, about 33 milliseconds wide. The information pulses are, for example, 3.3 milliseconds wide. These widths allow transmissions at the rate of about 100 words per minute.

DESCRIPTION OF SYSTEM

Figure 3:
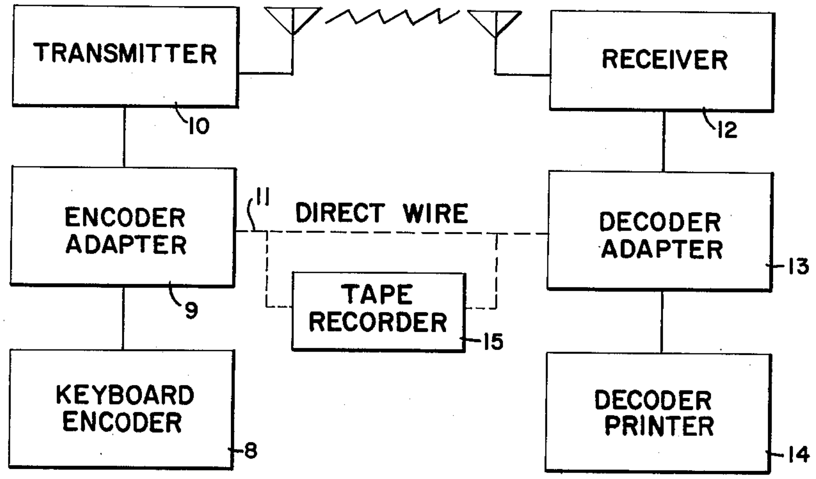
Fig. 3 is a block diagram of the complete apparatus of the invention.

Figure 3 is a block diagram of the complete communicator system of the invention. It consists of five major units as follows: Keyboard-encoder 8, encoder adapter 9, transmitter 10 or direct wire 11, a receiver 12 if transmitter 10 is used, a decoder adapter 13, and a decoder-printer 14. If desired the coded signals can be impressed on a tape recorder 15 at a slow speed and retransmitted with the tape moving at the same or at a high speed. Retransmitting at a high speed will materially increase the number of words transmitted per minute.

*(A) Keyboard-encoder 8*

The purpose of the keyboard-encoder unit 8 is to provide a means for inserting a message on a keyboard and converting this message into a sequence of electrical pulses characteristic of the particular message being sent. A standard typewriter has been modified by the incorporation of suitable switches and electrical circuits for this purpose. More specifically, a standard upright typewriter was modified to provide an input keyboard. Eleven notched rocker bars are pivoted beneath the keys of the typewriter and at right angles to the key bars. Ten of these bars are notched in accordance with the prearranged code best exemplified in Fig. 2. The bars with a tilting action actuate ten miniature microswitches for setting up a pulse sequence characteristic of the letter being sent. In other words, operation of typewriter bar Q closes switches S–1, S–2, S–3 and S–4. Operation of typewriter bar A closes switches S–1, S–2, S–3, and S–5. Operation of typewriter bar 2 closes switches S–3, S–4, S–8 and S–9. And so on. It may also be arranged that the typewriter key closes only one switch and that a diode matrix provides the correct sequence of pulses out. The 11th bar closes switch S–11 after the code has been established and during the final movement of each typewriter key and provides the print command. The 11th bar is likewise tilted to close switch S–11 upon striking the space bar of the typewriter.

Figure 4:
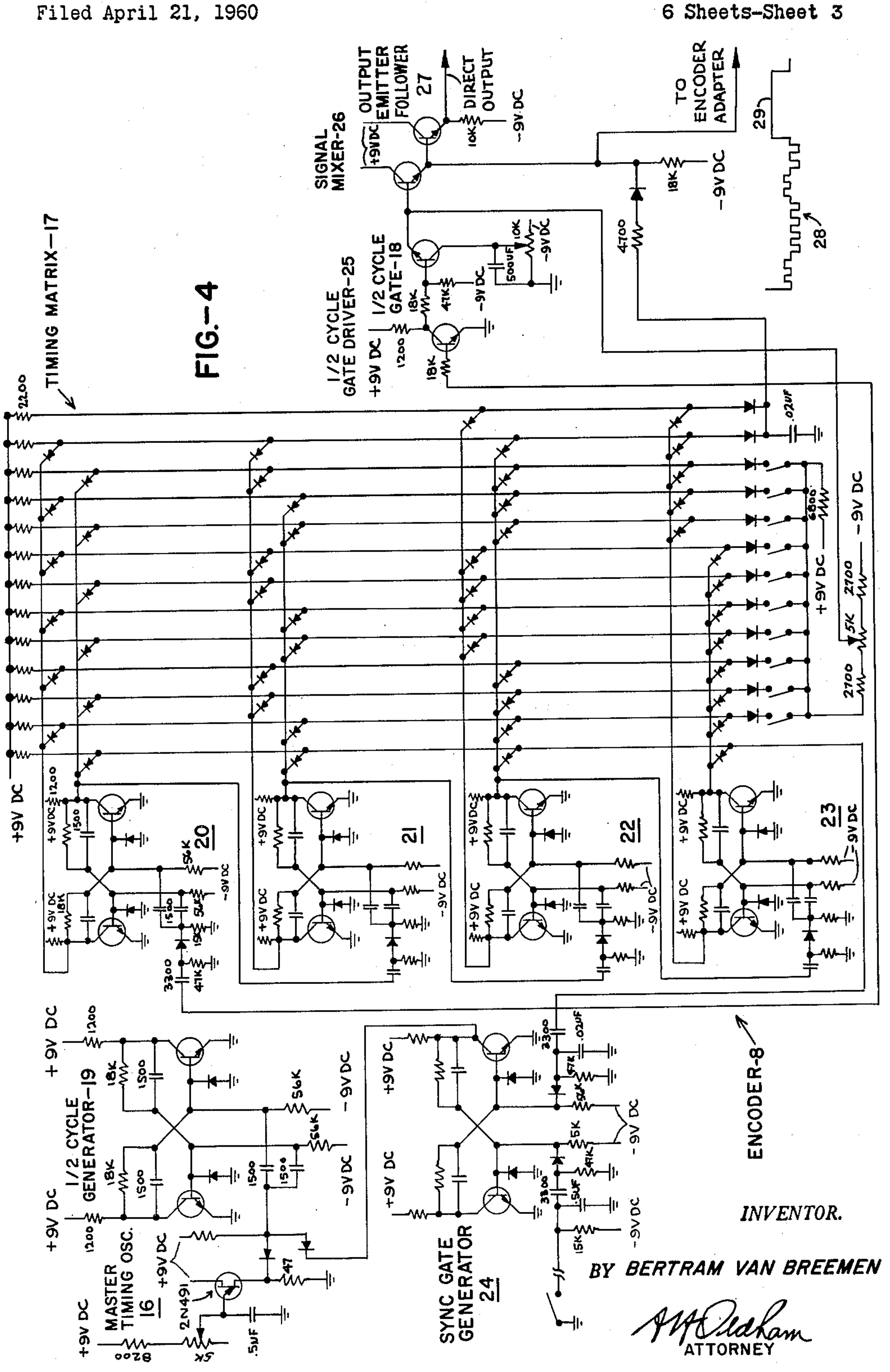
Fig. 4 is a wiring diagram of the keyboard encoder of Fig. 3.

Figure 4 is a schematic diagram of the encoder unit. A master timing oscillator 16 running at 300 cycles per second generates sync pulses which control the timing of the information and print pulses. The output of the diode timing matrix 17 is sent to a half cycle gate 18 the purpose of which is to chop the matrix output signals in such a way that when two pulses of like polarity follow one another they will be distinguished as individual pulses. The output of the half cycle generator 19 thus feeds the half cycle gate 18 connected to the output of the timing matrix 17 and is also sent to a cascade of four binary counters 20, 21, 22 and 23. These counters in conjunction with the diode matrix generate a series of signals whose polarity is either positive or negative depending upon whether switches S–1 through S–10, operated as before described, are either open or closed.

After the first pulse from the half cycle generator 19 the voltage on the matrix buss which is connected to switch S–1 will be +9 and all others zero. This action continues for 15 pulses and then the 16th pulse turns off the pulse from sync gate generator 24 thus stopping the counting action and placing the circuit in a condition to receive the next character. Whether switches S–1 through S–10 are open or closed, depends upon the code assigned to the character being sent.

The matrix 17 is arranged in such a way that the last five elements are used to provide an unchopped print pulse of amplitude equal to twice the amplitude of the information pulses. If pulse switches S–1 through S–10 are open, the half cycle gate 18 receives a negative signal. This signal when chopped by the half cycle gate becomes a series of negative pulses and represents no character, i.e. a space.

Closure of any switch results in a positive signal being sent to the half cycle gate 18 and this action produces a positive pulse corresponding to the element of matrix 1 to be printed.

The entire encoder unit uses sixteen 2N228 NPN germanium transistors and one 2N491 unijunction silicon transistor. The circuit components are shown, and unless otherwise specified all resistor values are in ohms and all capacitor values are in micro-microfarads. Completing the circuitry is a one half cycle gate driver 25, a signal mixer 26, and an output emitter follower 27. All diodes are IN90.

Plus 9 volts at 97 ma. and −9 volts at 3.8 ma. are required to power the unit for a total of 0.91 watt.

A typical waveform 28 is shown at the output of the encoder 8, this showing the output for the letter M with switches S–1, S–2, S–7 and S–8 being closed, and with printing pulse 29 of double amplitude.

(*B*) *Encoder adapter 9*

Figure 5:
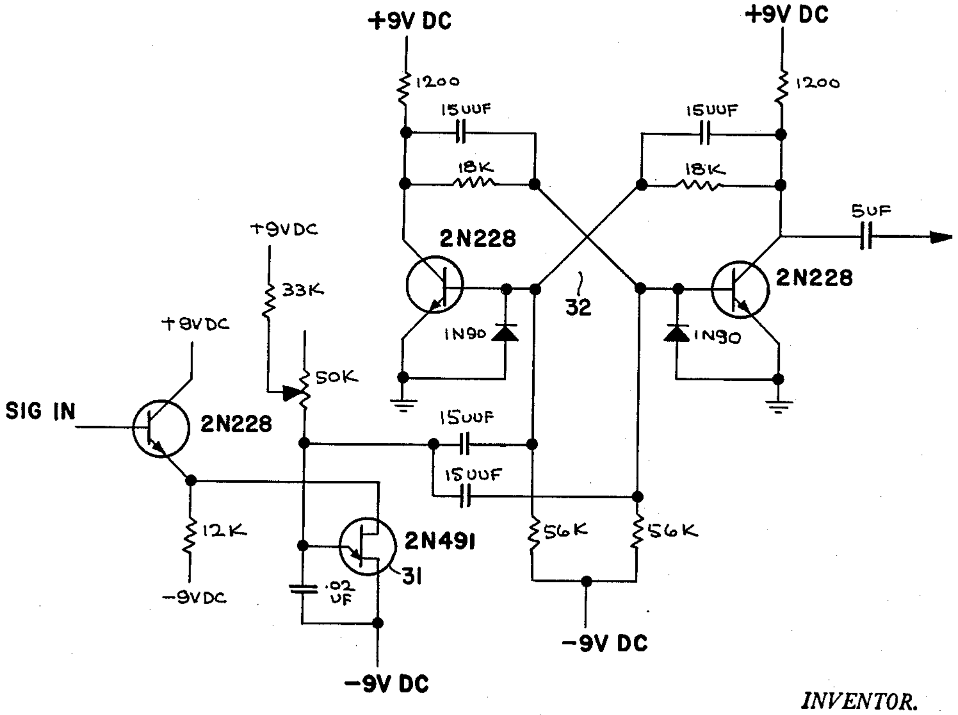
Fig. 5 is a wiring diagram of the encoder adapter of Fig. 3.

The adapter unit is shown in Figure 5. This unit is required to convert the pulse coded signals which may be considered as amplitude modulated signals into frequency modulated signals with which the original D.C. level may be preserved. Preservation of the D.C. level at the input to the decoder 14 is necessary since the shift register therein is made to store positive signals only. If pulses which are normally negative are superimposed upon a sufficiently positive D.C. offset, they will appear as positive signals and result in faulty decoding.

The adapter unit 9 consists of an emitter follower 30 driving a unijunction transistor multivibrator 31 which in turn is used to trigger a flip-flop circuit 32. The purpose of the flip-flop circuit is to provide clean square waves. The nominal frequency output for zero input voltage is 100 c.p.s. This frequency is increased to about 600 c.p.s. during transmission of a print pulse, to about 800 c.p.s. during transmission of positive information pulses and is increased to about 1200 c.p.s. during transmission of negative information pulses. The bandwidth thus used for transmitting the message is about 600 cycles per second. Recent calculations have indicated that the bandwidth could be reduced substantially without interfering with the ability to transmit 100 words per minute.

(*C*) *Transmitter 10*

Figure 6:
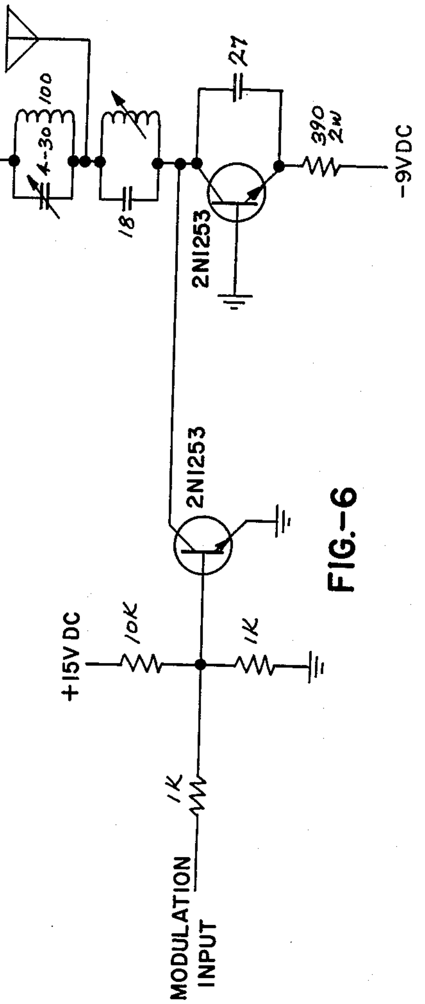
Fig. 6 is a wiring diagram of the transmitter of Fig. 3.

Fig. 6 schematically illustrates a portable "walkie-talkie" type of transmitter to be employed if a radio link is to be utilized, as in a battle field communicator.

(*D*) *Receiver 12*

Figure 7:
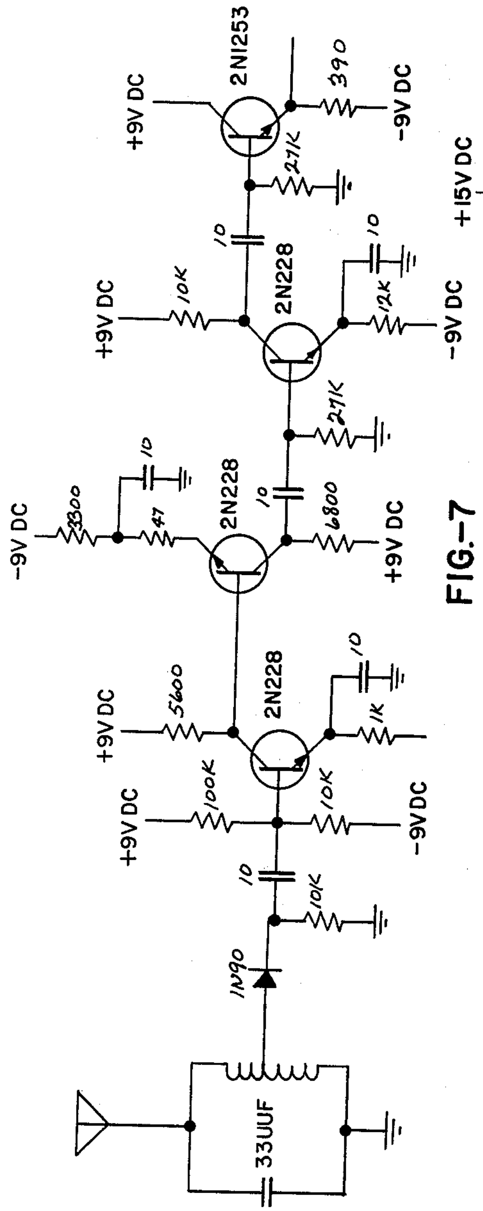
Fig. 7 is a wiring diagram of the receiver of Fig. 3.

Fig. 7 schematically illustrates a portable "walkie-talkie" type of receiver to be employed if a radio link is to be utilized, as in a battle field communicator.

(*E*) *Decoder adapter 13*

Figure 8:
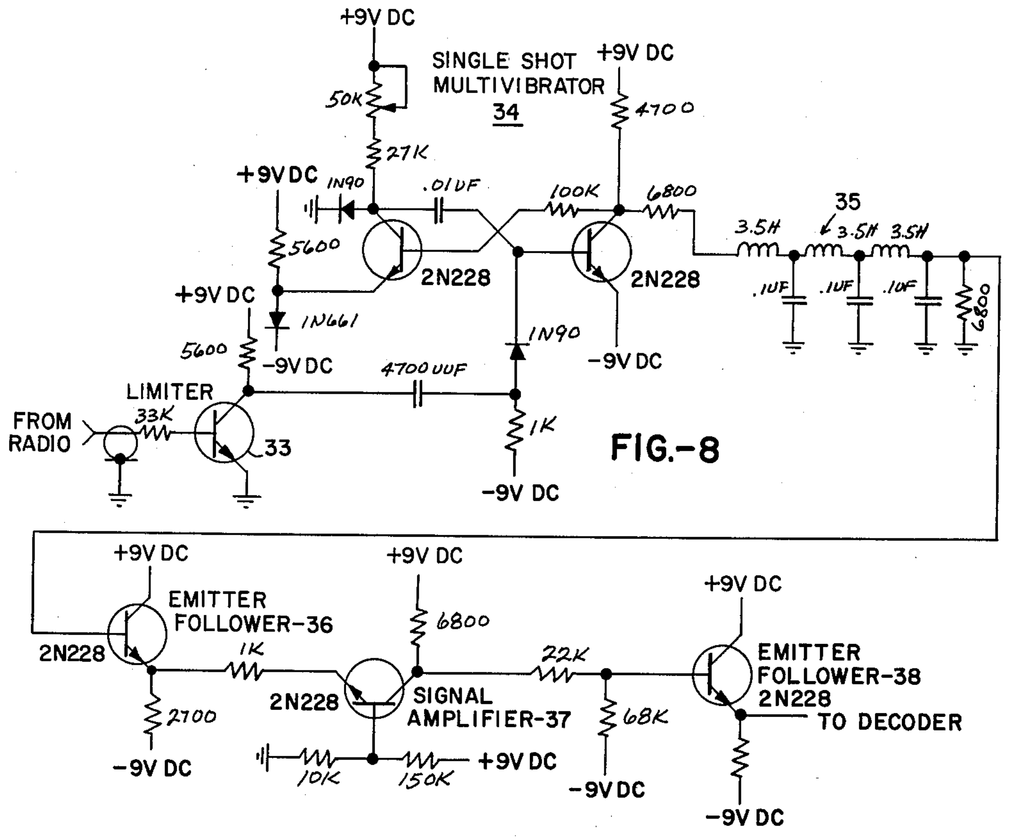
Fig. 8 is a wiring diagram of the decoder adapter of Fig. 3.

Fig. 8 illustrates schematically the decoder adapter which converts the signals from the receiver 12 back into their original pulse code form. Measurements indicated that these signals could be passed through a filter whose bandwidth was less than 400 c.p.s. without degrading the performance of the decoder. The signal from the receiver 12 is first limited in a single stage transistor amplifier 33, is differentiated and then used to trigger a single shot multivibrator 34. The output of the multivibrator is sent to a three stage LC filter 35 whose upper cutoff frequency is about 350 c.p.s.

When the space between the trigger pulses is equal to twice the pulse width of the single shot multivibrator, the average voltage at the input to the filter is zero. When the time between the trigger pulses is less than twice the pulse width the input to the filter is on the average positive. When the time between pulses is longer than twice the pulse width of the multivibrator the input to the filter is negative. The filter output which extends from D.C. on up to 300 c.p.s. is then a series of pulses which have been restored essentially to their original form and these pulses are then passed to emitter follower 36, amplifier 37, and emitter follower 38, and thence to the decoder printer 14.

(*F*) *Decoder printer 14*

Figure 9 is a schematic diagram of the decoder printer unit. A series of pulses 28 as previously described enter the circuitry at the left side of the diagram. The print pulse 29 is separated from the information pulses in the upper channel 40 and is used after amplification to actuate a relay which in turn operates solenoid 2 to apply pressure to the paper during printing by energizing the print head platen 3 and compresses a spring in the paper advance mechanism 6. When the pulse is completed, the spring advances the paper the width of one character.

The positive information pulses are separated and inverted in the middle channel 41. After inversion they are combined with the separated negative pulses in the lower channel 42 to be reinverted and amplified for use as shift pulses. The inverted positive pulses are also amplified, reinverted, and sent to #11 shift register element 43. The 11th shift register flip-flop is coupled to the 10th element 44 which in turn is coupled to the 9th 45, etc. Since the information which was in element #11 at the time print pulses appears is shifted to element #10, element #11 is not connected to an element in the printing matrix 1. All of the remaining shift register elements 46, 47, 48, 49, 50, 51, 52 and 53 are connected to the matrix 1 as shown in Fig. 9.

The elements of the head or matrix 1 which are energized in the manner described effect the flow of electric current through the electro sensitive tape 4 when the print head or matrix and the platen 3 are brought against opposite sides of the tape to thereby effect the printing of the coded character on the tape.

The shift register elements are all identical to that shown in element #10 and consist of two NPN transistors 54. The output of each of these elements is sent to an NPN—PNP power amplifier 55—56. The power required for adequate printing is greater than what can be supplied directly from the shift register output, thus the need for power amplification. The decoder-printer requires 96 milliamps at +9 volts, 28 milliamps at −9 volts, and about 70 milliamps at +13.5 volts when operated at approximately 100 words per minute.

Unless otherwise indicated, in Fig. 9 the value of all resistors is shown in ohms and the value of all capacitors is shown in microfarads.

(*G*) *D.C. to D.C. converter 57*

Figure 10:
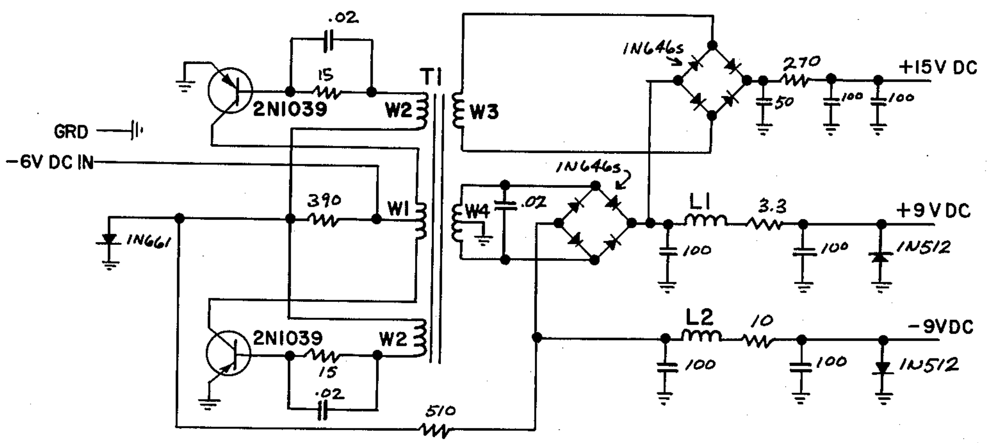
Fig. 10 is a wiring diagram of the D.C. to D.C. converter of Fig. 9.

Fig. 10 shows schematically the wiring diagram for and components of the D.C. to D.C. converter 57 of Fig. 9. This supplies power to the entire receiver and printer portion of the apparatus at −9 volts, +9 volts, and +15 volts D.C. at required milliamps from six volt battery 58 powering the system when it is operated portable as described. Details of the construction of the transformer and choke coils are given on the drawing, resistor values are shown in ohms, and capacitor values in microfarads.

The same type of converter is provided to power the encoder and transmitter portion of the apparatus.

(*H*) *Tape recorder 15*

The tape recorder 15, of standard form, may be connected to receive the coded message direct from the encoder-adapter 9 and to store the message thereon at a standard speed, such as a tape movement of 7.5 inches per second. Thereafter the stored message on the tape can be picked off of it when it is traveling at a higher speed and passed to the decoder-adapter by direct wire 11 or by radio. Thus, transmissions of 100 words a minute are easily obtained from previously coded messages at a slower speed. Of course, with a skilled typist speeds of up to 100 words per minute may be obtained directly.

The showing of the tape recorder 15 in association with the direct wire 11 points up the fact that instead of the radio transmission of the coded message by transmitter 10 and receiver 12 that a direct wire 11 can be utilized in certain uses of the apparatus of the invention.

SUMMARY

The operation of the apparatus will be understandable to one skilled in the art from the foregoing description and detailed wiring diagrams. The apparatus is battery operated and completely portable. In actual practice the decoder-printer and decoder adapter and power supply are housed in a case about 10″ x 6″ x 2¾″. The entire keyboard-encoder, encoder adapter and power supply are housed in a case about the size of a portable typewriter. The "walkie-talkie" transmitter and receiver are very small and light in weight to adapt the apparatus, for example, to battle field communication use.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a portable type communication apparatus of a typewriter keyboard controlled encoder means for providing a coded series of pulses and a print signal for each character struck on the keyboard, adapter means for converting the coded series of pulses and print signal from amplitude modulated to frequency modulated, radio means for transmitting the frequency modulated pulses and print signal, radio means for receiving the transmitted pulses and signal, adapter means for converting the frequency modulated pulses and signal back to the amplitude modulated coded series of pulses and print signal, decoder means for storing the pulses in a shift register, a print head having a plurality of segmental line-like printing elements equal in number to the number of elements in the shift register and capable of printing any desired character when the proper printing elements are energized, means responsive to the print signal for moving the pulses out of the shift register and for electrically energizing selected printing elements on the print head, an electro-sensitive paper tape, means mounting the tape for movement over the print head, a platen adapted to engage with the side of the tape opposite the print head, means responsive to the print signal for effecting relative movement between the platen and the print head to squeeze the tape therebetween, means for advancing the tape one character space after each print signal, and battery means for powering the apparatus.

2. The combination in a portable type communication apparatus of a typewriter keyboard controlled encoder means for providing a coded series of pulses and a print signal for each character struck on the keyboard, adapter means for converting the coded series of pulses and print signal from amplitude modulated to frequency modulated, means for transmitting the frequency modulated pulses and print signal, adapter means for converting the frequency modulated pulses and signal back to the amplitude modulated coded series of pulses and print signal, decoder means for storing the pulses in a shift register, a print head having a plurality of segmental line-like printing elements equal in number to the number of elements in the shift register and capable of printing any desired character when the proper printing elements are energized, means responsive to the print signal for moving the pulses out of the shift register and for electrically energizing selected printing elements on the print head, an electro-sensitive paper tape, means mounting the tape for movement over the print head, a platen adapted to engage with the side of the tape opposite the print head, means responsive to the print signal for effecting relative movement between the platen and the print head to squeeze the tape therebetween, means for advancing the tape one character space after each print signal, and battery means for powering the apparatus.

3. The combination in a portable type communication apparatus of a typewriter keyboard controlled encoder means for providing a coded series of pulses and a print signal for each character struck on the keyboard, adapter means for converting the coded series of pulses and print signal from amplitude modulated to frequency modulated, means for transmitting the frequency modulated pulses and print signal, adapter means for converting the frequency modulated pulses and signal back to the amplitude modulated coded series of pulses and print signal, decoder means for storing the pulses in a shift register, a print head having a plurality of segmental line-like printing elements equal in number to the number of elements in the shift register and capable of printing any desired character when the proper printing elements are energized, means responsive to the print signal for moving the pulses out of the shift register and for electrically energizing selected printing elements on the print head, an electro-sensitive paper tape, means mounting the tape for movement into proximity with the print head, a platen adapted to engage with the side of the tape opposite the print head, means responsive to the print signal for effecting relative movement between the platen and the print head to squeeze the tape therebetween, and means for advancing the tape one character space after each print signal.

4. The combination in a portable type communication apparatus of an encoder means for providing a coded series of pulses and a print signal for each desired character, adapter means for converting the coded series of pulses and print signal from amplitude modulated to frequency modulated, means for transmitting the frequency modulated pulses and print signal, adapter means for converting the frequency modulated pulses and signal back to the amplitude modulated coded series of pulses and print signal, decoder means for storing the pulses in a shift register, a print head having a plurality of segmental line-like printing elements equal in number to the number of elements in the shift register and capable of printing any desired character when the proper printing elements are energized, means responsive to the print signal for moving the pulses out of the shift register and for electrically energizing selected printing elements on the print head, an electro-sensitive paper tape, means mounting the tape for movement into proximity with the print head, a platen adapted to engage with the side of the tape opposite the print head, means responsive to the print signal for effecting relative movement between the platen and the print head to squeeze the tape therebetween, and means for advancing the tape one character space after each print signal.

5. Communications apparatus including an encoder means for providing a coded series of pulses for any desired character to be transmitted and a print signal of greater amplitude and duration than any pulses, said encoder means including binary circuits, means for transmitting the coded series of pulses and the print signal, decoder means for receiving the transmitted series of pulses and the print signal, said decoder means including a shift register for storing the coded series of pulses, a print head having a plurality of segmental line-like printing elements equal in number to the number of elements in the shift register and capable of printing any desired character when the proper printing elements are energized, means responsive to the print signal for moving the pulses out of the shift register and for electrically energizing selected printing elements on the print head, an electro-sensitive paper tape, means mounting the tape for movement over the print head, a platen adapted to engage with the side of the tape opposite the print head, means responsive to the print signal for effecting relative movement between the platen and the print head to squeeze the tape therebetween, means for advancing the tape one character space after each print signal, and battery means for powering the apparatus.

6. Communications apparatus including an encoder means for providing a coded series of pulses for any desired character to be transmitted and a print signal of greater amplitude and duration than any pulse, said encoder means including binary circuits, means for transmitting the coded series of pulses and the print signal, decoder means for receiving the transmitted series of pulses and the print signal, said decoder means including a shift register for storing the coded series of pulses, a print head having a plurality of segmental line-like printing elements equal in number to the number of elements in the shift register and capable of printing any desired character when the proper printing elements are energized, means responsive to the print signal for moving the pulses out of the shift register and for electrically energizing selected printing elements on the print head, an electro-sensitive paper tape, means mounting the tape for movement into proximity with the print head, a platen adapted to engage with the side of the tape opposite the print head, means responsive to the print signal for effecting relative movement between the platen and the print head to squeeze the tape therebetween, and means for advancing the tape one character space after each print signal.

7. Communications apparatus including an encoder means for providing a coded series of pulses for any desired character to be transmitted and a print signal of greater amplitude and duration than any pulse, means for transmitting the coded series of pulses and the print signal, decoder means for receiving the transmitted series of pulses and the print signal, said decoder means including a shift register for storing the coded series of pulses, a print head having a plurality of segmental line-like printing elements equal in number to the number of elements in the shift register and capable of printing any desired character when the proper printing elements are energized, means responsive to the print signal for moving the pulses out of the shift register and for electrically energizing selected printing elements on the print head, an electro-sensitive paper tape, means mounting the tape for movement into proximity with the print head, a platen adapted to engage with the side of the tape opposite the print head, means responsive to the print signal for effecting relative movement between the platen and the print head to squeeze the tape therebetween, and means for advancing the tape one character space after each print signal.

8. Communications apparatus including an encoder means for providing a coded series of pulses for any desired character to be transmitted and a print signal of greater amplitude and duration than any pulse, means for transmitting the coded series of pulses and the print signal, decoder means for receiving the transmitted series of pulses and the print signal, a print head having a plurality of segmental line-like printing elements and capable of printing any desired character when the proper printing elements are energized, means responsive to the print signal for electrically energizing selected printing elements on the print head in accord with the coded pulses, an electro-sensitive paper tape, means mounting the tape for movement into proximity with the print head, a platen adapted to engage with the side of the tape opposite the print head, means responsive to the print signal for effecting relative movement between the platen and the print head to squeeze the tape therebetween, and means for advancing the tape one character space after each print signal.

No references cited.

UNITED STATES PATENT OFFICE

CERTIFICATE OF CORRECTION

Patent No. 2,977,415 March 28, 1961

Bertram Van Breemen

It is hereby certified that error appears in the above numbered patent requiring correction and that the said Letters Patent should read as corrected below.

In the grant, line 1, in the drawings, sheets 1 through 6, line 1, and in the heading to the printed specification, line 3, name of inventor, for "Bertram Van Breeman", each occurrence, read -- Bertram Van Breemen --.

Signed and sealed this 26th day of September 1961.

(SEAL)
Attest:

ERNEST W. SWIDER
Attesting Officer

DAVID L. LADD
Commissioner of Patents

USCOMM-DC